(12) United States Patent
Boyce

(10) Patent No.: US 8,712,169 B2
(45) Date of Patent: Apr. 29, 2014

(54) TRANSCODED IMAGES FOR IMPROVED TRICK PLAY

(75) Inventor: Jill MacDonald Boyce, Manalapan, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1355 days.

(21) Appl. No.: 11/989,515

(22) PCT Filed: Aug. 26, 2005

(86) PCT No.: PCT/US2005/030523
§ 371 (c)(1),
(2), (4) Date: Jan. 25, 2008

(87) PCT Pub. No.: WO2007/024236
PCT Pub. Date: Mar. 1, 2007

(65) Prior Publication Data
US 2009/0129689 A1    May 21, 2009

(51) Int. Cl.
*G06K 9/36* (2006.01)
*G06K 9/46* (2006.01)
*H04N 7/14* (2006.01)

(52) U.S. Cl.
USPC .................................... 382/232; 348/14.13

(58) Field of Classification Search
USPC ................. 382/232, 233; 348/14.13
See application file for complete search history.

(56) References Cited

U.S. PATENT DOCUMENTS

| | | | |
|---|---|---|---|
| 5,477,397 A | 12/1995 | Naimpally et al. | |
| 5,589,993 A | 12/1996 | Naimpally | |
| 6,542,693 B2 | 4/2003 | Boyce | |
| 6,628,712 B1 * | 9/2003 | Le Maguet | 375/240.12 |
| 7,376,341 B2 | 5/2008 | Willis | |
| 2001/0001159 A1 | 5/2001 | Ford | |
| 2001/0026677 A1 * | 10/2001 | Chen et al. | 386/68 |
| 2002/0147782 A1 | 10/2002 | Dimitrova et al. | |
| 2003/0007556 A1 | 1/2003 | Oura et al. | |

(Continued)

FOREIGN PATENT DOCUMENTS

| | | |
|---|---|---|
| JP | 7-59047 | 3/1995 |
| JP | 7-75112 | 3/1995 |

(Continued)

OTHER PUBLICATIONS

Abram-Profeta E L et al: "Providing unrestricted VCR functions in multicast video-on-demand servers", Multimedia Computing and Systems, 1998. Proceedings. IEEE International Conference on Austin, TX, USA Jun. 28-Jul. 1, 1998, Los Alamitos, CA, USA, IEEE Comput. Soc., US, Jun. 28, 1998, pp. 66-75, XP010291556, ISBN: 0-8186-8557-3, p. 67, paragraph 2.2-p. 68, paragraph 2.3.

(Continued)

*Primary Examiner* — Bernard Krasnic
(74) *Attorney, Agent, or Firm* — Robert D. Shedd; Kuniyuki Akiyama

(57) ABSTRACT

A method and apparatus are provided for facilitating processing of images contained in an encoded video stream wherein a plurality of non-intra coded images are transcoded into intra-coded images (I-images). The transcoded I-images are then used to facilitate trick mode playback, such as reverse playback, fast reverse playback or fast forward playback. In addition, an image sequence window is defined and transcoded I-images which fall outside of the image sequence window are deleted from a memory.

18 Claims, 4 Drawing Sheets

(56) References Cited

U.S. PATENT DOCUMENTS

| | | | |
|---|---|---|---|
| 2003/0231863 A1* | 12/2003 | Eerenberg et al. | 386/68 |
| 2004/0056884 A1* | 3/2004 | Eifrig et al. | 345/720 |
| 2004/0073936 A1* | 4/2004 | Kurauchi | 725/90 |
| 2005/0172067 A1 | 8/2005 | Sinclair | |
| 2005/0207449 A1* | 9/2005 | Zhang et al. | 370/486 |

FOREIGN PATENT DOCUMENTS

| | | |
|---|---|---|
| JP | 11096775 | 4/1999 |
| JP | 2000-32400 | 1/2000 |
| JP | 2001339693 | 12/2001 |
| JP | 2004071033 | 3/2004 |
| JP | 2005-507186 | 3/2005 |
| JP | 2005-159832 | 6/2005 |
| WO | WO 2004/049719 | 6/2004 |
| WO | WO 2007024236 A1 * | 3/2007 |

OTHER PUBLICATIONS

Search report dated Nov. 28, 2005.

Hari Kalva, "Issues in H.264/MPEG-2 Video Transcoding", Computer Science and Engineering, Florida Atlantic University, Boca Raton, FL, 5 pgs, 2004.

Wiegand, Thomas. "Draft ITU-T recommendation and final draft international standard of joint video specification," ITU-T rec. H. 264| ISO/IEC 14496-10 AVC (2003).

ISO-IEC 13618-2 (1996) Genetic Coding of Moving Pictures.

* cited by examiner

| IMAGE NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ORIGINAL CODING | I | B | B | P | B | B | P | B | B | P | B | B | P | B | B | I |
| TRANSCODING | | | | I' | | | I' | | | I' | | | I' | | | I' |

TRANSCODED IMAGES FOR IMPROVED TRICK PLAY

This application claims the benefit, under 35 U.S.C. §365 of International Application PCT/US2005/030523, filed Aug. 26, 2005, which was published in accordance with PCT Article 21(2) on Mar. 1, 2007 in English.

FIELD OF THE INVENTION

The present invention generally relates to digital video recorders and, more particularly, to trick mode playback of video content encoded in a compressed digital bitstream.

BACKGROUND OF THE INVENTION

Video content is often digitally encoded in a compressed format to minimize an amount of storage necessary to store the video content, and to minimize the amount of bandwidth necessary for transmitting the video content to content viewers. Popular video compression standards are the MPEG-2 format and the JVT/H.264/MPEG AVC (hereinafter "H.264") format. These compression standards use both intra coding and inter coding.

Intra coding utilizes spatial redundancy within a picture or slice to reduce the amount of image data necessary to reproduce the picture or slice by describing successive image pixels or patterns of pixels jointly. An image that is intra coded is commonly known as an intra picture (I-picture) for MPEG-2 encoded video and as an intra slice (I-slice) for H.264 encoded video.

Inter coding utilizes redundancy between successive images to reduce image data by temporally repeating portions of an image that are almost identical to portions of other images within a particular group of pictures (GOP), which is the atomic unit of an MPEG video stream. There commonly are two types of inter coded pictures for MPEG-2 encoded video: a predictive picture (P-picture) and a bidirectional predictive picture (B-picture). Similarly, there are two types of inter coded slices for H.264 encoded video: a predictive slice (P-slice) and a bidirectional predictive slice (B-slice).

In the MPEG-2 compression scheme, a P-picture contains motion vectors describing differences in the P-picture from the closest previous I-picture or P-picture. A B-picture contains motion vectors describing differences in the B-picture from previous or subsequent I-pictures or P-pictures. In the H.264 compression scheme, a P-slice contains predictors describing differences in the P-slice from a reference picture contained in a first list, commonly known as list 0. A B-slice contains predictors describing differences in the B-slice by considering either list 0, a second list known as list 1, or considering both list 0 and list 1 (bi-prediction). When bi-prediction is used, list 0 and list 1 predictors are averaged together to form a final predictor. Hereinafter, I-pictures and I-slices are collectively referred to as I-images, P-pictures and P-slices are collectively referred to as P-images, and B-pictures and B-slices are collectively referred to as B-images. An I-image, a plurality of P-images, and a plurality of B-images are typically provided in each group of images.

Digital television broadcast systems typically stream compressed video content to digital television receivers. Personal video recorders (PVRs) are oftentimes used in conjunction with the receivers to store the video content onto a hard disk drive (HDD), thereby enabling a viewer to time shift presentation of the video content and to implement trick mode playback of the video stream. Examples of trick mode playback are fast forward and fast reverse.

A video decoder is used to decode the video content when playback is desired. To decode a particular group of images, the decoder must first decode the I-image within the group of images, and then decode subsequent P-images and B-images within the group of images. During fast forward or fast reverse playback, only a fraction of the stored video images are displayed. However, because the compressed video is coded with inter-images dependencies (i.e. P-images and B-images), it is necessary to decode more compressed images than will be displayed. Thus, implementation of fast forward and fast reverse playback requires faster decoding speed than that required for normal playback. Fast reverse is even more problematic than fast forward playback, however, because normal decoding of images that are late in display order of a group of images require availability of decoded images that are intended for display earlier in the group of images.

With regards to the type of compression applied to a particular video stream, it should be noted that decoding of groups of images generated in accordance with the H.264 format is more computationally complex than decoding MPEG-2 images because the H.264 image groups include more potential inter-image dependencies. Thus, even greater decoding speed is needed to perform trickmode playback for a video stream generated in accordance with the H.264 format.

Video processors powerful enough to provide high speed decoding adequate for fast forward and fast reverse playback are expensive, especially those video processors which can provide fast reverse playback for an H.264 encoded video stream. Some prior art solutions to the above deficiencies include recording low resolution video signals using intra-frame encoding techniques. For example, U.S. Pat. No. 5,477, 397 teaches recording low resolution video signals using intra-frame encoding techniques in a unique portion of a video tape for achieving trick modes. Such prior art solution, however require a lot of storage space, for example, enough tape space to record a second, low resolution version of a received video. Thus a solution is needed which enables fast forward and fast reverse playback to be performed using a low cost video processor and low cost storage means.

SUMMARY OF THE INVENTION

The present invention provides a method and apparatus for facilitating processing of images contained in an encoded video stream. In one embodiment of the present invention, the apparatus comprises a personal video recorder. In accordance with the present invention, a plurality of non-intra coded images are transcoded into intra-coded images (I-images). For instance, predictive images (P-images), bidirectional images (B-images), or a combination of P-images and B-images are transcoded into I-images. In addition, the transcoding of the images can be performed during normal playback of the encoded video stream.

The plurality of the transcoded I-images are then stored to, for example, a data store. A sliding image sequence window containing a plurality of the transcoded I-images is defined, which tracks the normal playback of the video stream. In accordance with the present invention, transcoded I-images which fall outside of the sliding image sequence window are deleted from storage.

The transcoded I-images can also be decoded during trick mode playback of the video stream, for example reverse trick play, fast reverse trick play or fast forward play. Furthermore, during fast playback trick mode, a combination of the transcoded I-images and originally coded images are decoded, and the transcoded I-images are used as references for predicting respective ones of the originally coded images.

BRIEF DESCRIPTION OF THE DRAWINGS

Preferred embodiments of the present invention will be described below in more detail, with reference to the accompanying drawings, in which.

Figures 1, 2:
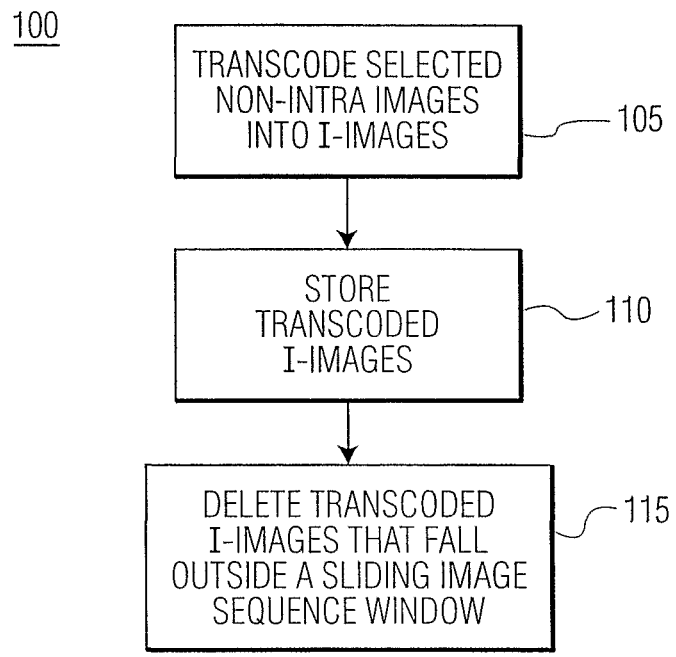
FIG. 1 depicts a flow diagram of a method for transcoding images in accordance with an embodiment of the present invention.
FIG. 2 depicts a table that identifies images selected from a group of images for transcoding in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION

The present invention relates to a method and apparatus for improving trick play for an encoded video stream. In particular, non-intra coded images, such as predictive pictures or slices (P-images) and bidirectional pictures or slices (B-images), are transcoded into intra coded images (I-images). In accordance with the present invention, during trick play, for example fast reverse play, these transcoded I-images can be used in place of the original images from which they were transcoded. The decoding of the I-images is less complex than decoding the original images because the I-images are decoded independently of other images, whereas decoding of P-images and B-images also requires decoding of other images from which they are predicted as well as motion estimation. Accordingly, use of transcoded I-images during trick play in accordance with the present invention requires significantly less video processing in comparison to use of P-images and B-images. Thus, a lower complexity video processor can be used.

FIG. 1 depicts a flow diagram of a method for transcoding images in accordance with an embodiment of the present invention. The method 100 of FIG. 1 begins at step 105, where selected non-intra images within an encoded video stream are transcoded into I-images. In one embodiment of the present invention, the images are transcoded during playback of the video stream. Since the images will already have been decoded for playback, the additional processing power required to complete the transcoding into I-images is relatively minimal. Nonetheless, the invention is not limited in this regard. For example, the images can be transcoded before playback of the video stream, during storage of the video stream to a data store, or after storage of the video stream. All of the non-intra coded images (e.g. B-images and P-images) can be transcoded, or selected images can be transcoded. For instance, P-images can be exclusively selected for transcoding, B-images can be exclusively selected for transcoding, or a combination of P-images and B-images can be selected for transcoding.

FIG. 2 depicts a table that identifies images selected from a group of images for transcoding in accordance with an embodiment of the present invention. In FIG. 2, a table 200 is depicted which contains a data structure for a group of images 205 from which only certain images 210 are selected for transcoding. The images 210 are selected to result in evenly spaced I-images throughout the group of images 205 to provide smoother fast reverse and fast forward playback. In the arrangement depicted in FIG. 2, the selected images 210 are images which were originally coded as P-images, although B-images also can be used, as noted above. Referring back to FIG. 1, at step 110 the transcoded I-images can be stored to a data store.

In one embodiment of the present invention, the transcoded I-images are maintained on the data store for possible use at a later time, for example for reverse trick play, fast forward trick play, or normal play. Such an arrangement can facilitate random access to any desired portion of a video presentation using minimal image processing resources while providing high image quality. However, such a data store would require relatively large storage capacity to store all such images within a video presentation as I-images. The storage capacity, however, can be reduced by reducing the bitrate of the transcoded pictures, although this may result in lower image quality.

Figure 3:
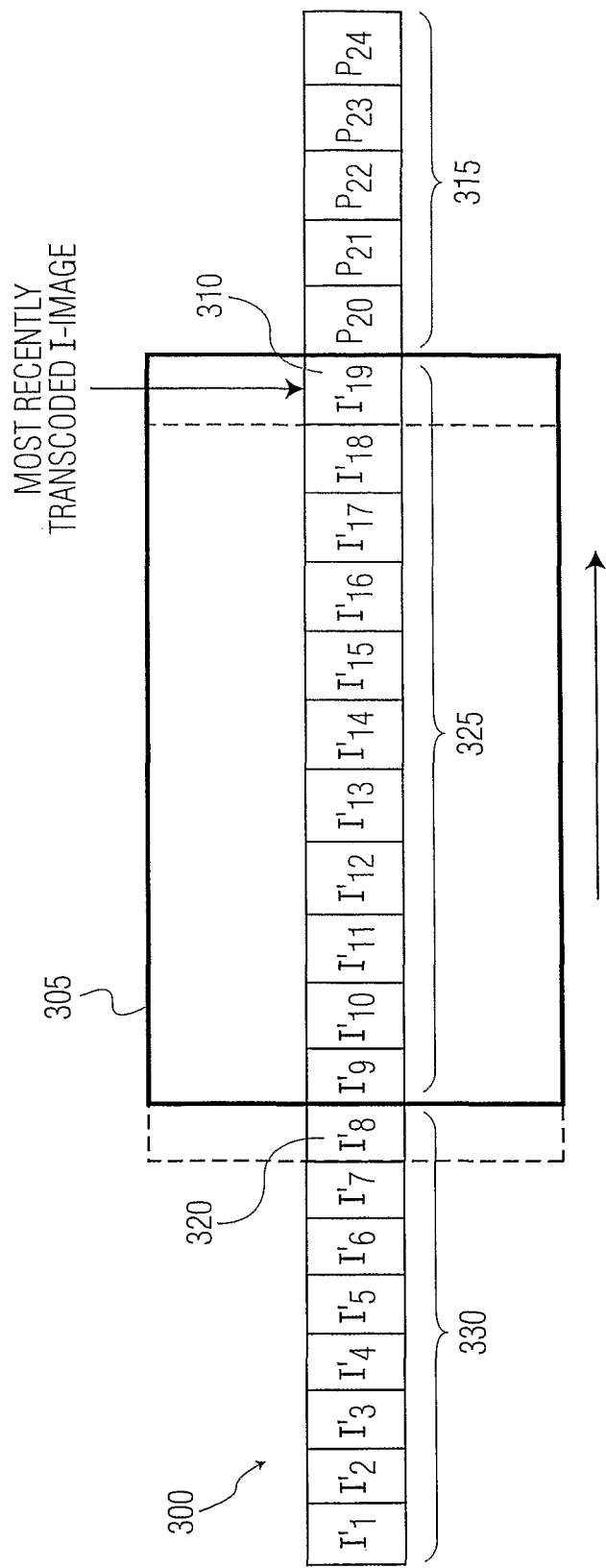
FIG. 3 depicts an image sequence table in accordance with an embodiment of the present invention.

In an alternate embodiment of the present invention and referring to step 115 of FIG. 1 above, images that fall outside of a sliding sequence window can be deleted. For example, FIG. 3 depicts an image sequence table in accordance with an embodiment of the present invention. In the table 300 of FIG. 3, only images in the video sequence which have been, or are going to be transcoded are shown in the image sequence table 300. Thus, although the video stream may contain originally coded I-images and B-images, such images are not depicted in the example sequence. Moreover, in the example only P-images are shown as being transcoded, but as previously noted, in alternate embodiments of the present invention B-images can be transcoded as well.

A sliding image sequence window 305 is defined in FIG. 3, which tracks the most recently transcoded I-image 310. In particular, each time a next non I-image 315 is transcoded to form the most recently transcoded I-image 310, the I-image 310 is sequentially added to the data store. An oldest I-image 320 can be then deleted from the data store.

The use of the sliding image sequence window 305 to store the transcoded I-images 325 in accordance with the present invention enables the reduction of the amount of decoding that would otherwise be required to rewind, fast forward, or play the images, and improve image quality during such operations. Notwithstanding, viewers typically are not concerned with image quality when rewinding through significant amounts of video content, for example while rewinding back to the beginning of a movie. Deleting transcoded I-images 330 which fall outside the image sequence window 305 in accordance with the present invention reduces the amount of storage resources that are allocated to storing the transcoded I-images 325 without requiring a reduction in the bitrate of the transcoded images. Nonetheless in alternate embodiments of the present invention, a bitrate reduction can be implemented in combination with the sliding image sequence window 305 of the present invention to reduce even further the amount of storage capacity required to store the transcoded I-images 325.

Figure 4:
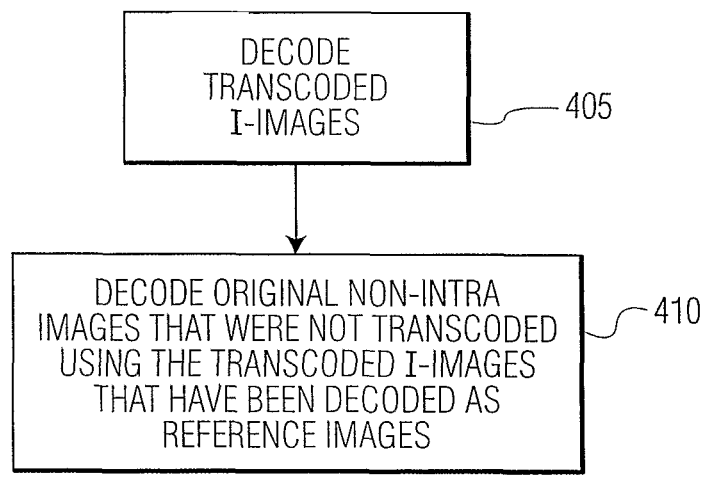
FIG. 4 depicts a flow diagram of a method for decoding transcoded images in accordance with an embodiment of the present invention.

FIG. 4 depicts a flow diagram of a method for decoding transcoded images in accordance with an embodiment of the present invention. The method 400 of FIG. 4 begins at step 405, where transcoded I-images, such as those generated from original P-images, are decoded. At step 410, such decoded images are used as prediction source images for other images that have not been transcoded. For example, if a non-intra image is a P-image or B-image which was predicted from one or more original images that have been transcoded, the non-intra images can be predicted from the transcoded versions of the images from which they were originally predicted.

Figure 5:
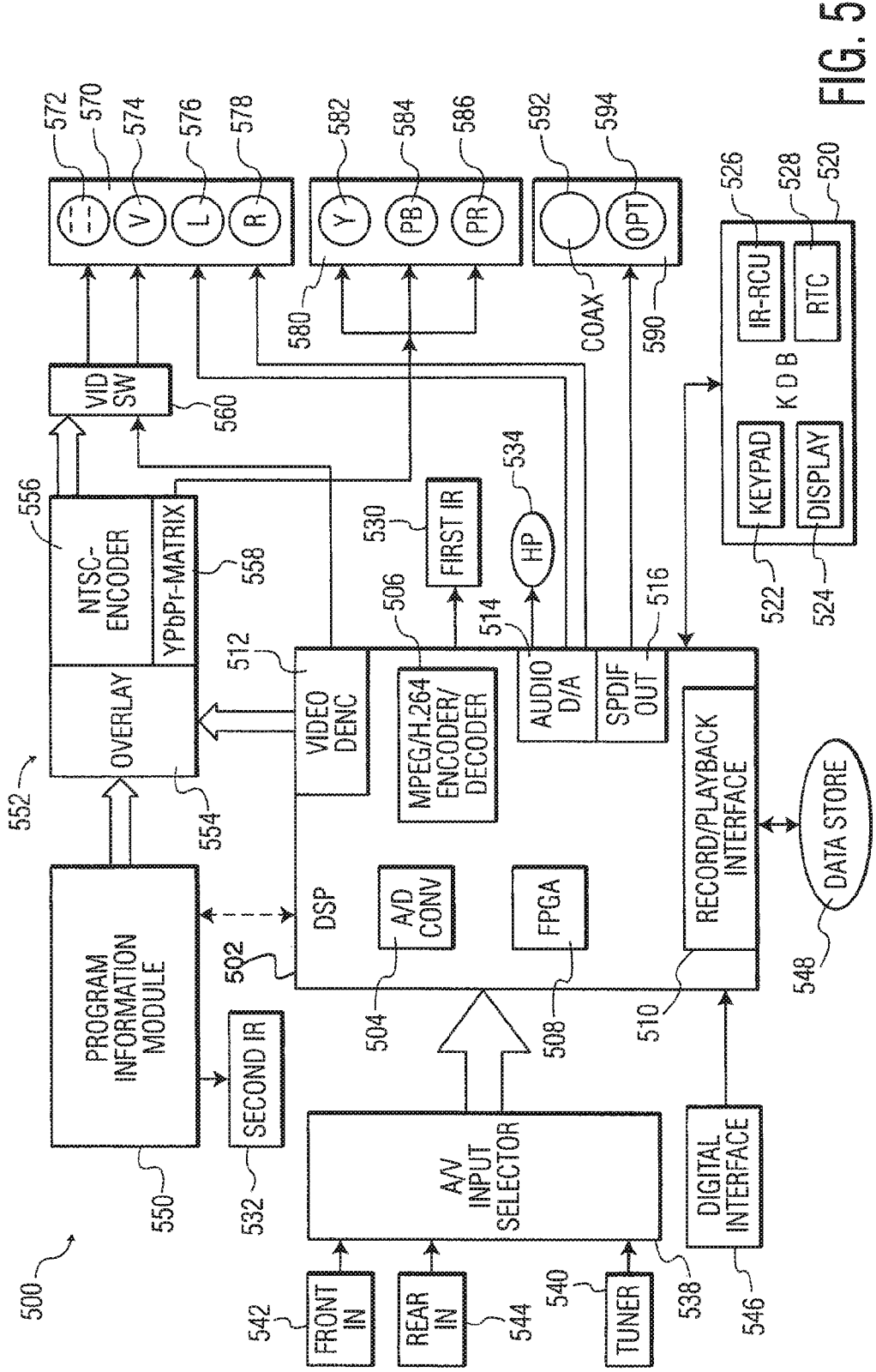
FIG. 5 depicts a high level block diagram of a personal video recorder in accordance with an embodiment of the present invention.

FIG. 5 depicts a high level block diagram of a personal video recorder in accordance with an embodiment of the present invention. The PVR 500 of FIG. 5 illustratively includes a processor, for example digital signal processor (DSP) 502 or any other suitable processor, for processing of images contained in an encoded video stream by transcoding a plurality of non-intra coded images into I-images and implementing the methods previously described. The PVR 500 of FIG. 5 also includes a key and display board 520, a tuner 540, an A/V input selector 538, a USB input 546, a storage device 548 and a program information module 550. Additionally, the PVR 500 of FIG. 5 illustratively includes first and second infra-red (IR) links 530 and 532, a video overlay encoder 552, a video switch 560, a headphone jack 534, a standard A/V component connector block 570, a YPbPr component connector block 580, and a Sony/Phillips digital interface (SPDIF) connector block 590.

The component connector blocks 570, 580 and 590 provide audio/video signals in a variety of output formats. For example, the standard A/V component connector block 570 can comprise an S-video connector 572 for outputting to a video display video that has been separated into chrominance and luminance video signals and a composite video connector 574 for providing a standard composite video signal. Further, the standard A/V component connector block 570 can comprise left and right audio output connectors, 576 and 578, respectively.

The YPbPr component connector block 580 is typically used for high definition television (HDTV). The YPbPr component connector block 580 comprises a video luminance (Y) output connector 582 for providing an analog video luminance component, a Pb output connector 584 for providing an analog blue color difference (B−Y), and a Pr output connector 586 for providing an analog red color difference (R−Y). Furthermore, the SPDIF component connector block 590 comprises a coaxial output 592 and an optical output 594 for outputting digital audio signals via a coaxial cable or fiber optic cable, respectively.

The key and display board 520 are provided as a user interface for the PVR 500. The key and display board 520 incorporate a keypad 522, a display 524, an IR remote control interface 526 and a real time clock 528. By using the keypad 522 or the IR remote control interface 526, a user is able to select functions to be executed by the PVR 500 to perform a desired PVR operation. For example, a user can choose to change channels on the PVR 500 or to perform trick mode playback. The real time clock 528 keeps time, which can be shown by the display 524. The display 524 also can show other information as well, for example a trick mode being executed by the PVR 500, a selected channel being recorded by the PVR 500, or an identifier representative of a presentation being shown on a video display.

First and second IR links 530 and 532 form a set of communication links between satellite and non-satellite applications to help simplify the interface between the audio, video, and data streams. The first IR link 530 can be a communication interface between the DSP 502 and other devices having an IR communication link. Notably, the first IR link 530 can be useful for controlling other devices designed specifically for aired or cable television broadcasts or radio broadcasts using standard program guide information. The first IR link 530 also can enable features to simplify the consumer's interaction between devices. For example, the first IR link 530 can enable one touch program recording, as well as other user conveniences. The second IR link 532 can provide an interface between the program information module 550 and other devices having IR communication links. The second IR link 532 can be useful for communicating with devices not requiring a direct connection to DSP 502, for example with a cable reception device, a VCR, etc.

The DSP 502 executes programmed functions and process user inputs. For instance, the DSP 502 can receive user inputs for changing channels, establishing/changing recording parameters, and performing trick play. The DSP 502 comprises an analog to digital (A/D) converter 504, an MPEG/H.264 encoder/decoder 506, a field programmable gate array (FPGA) 508, a recorder/playback interface 510, a video digital encoder 512, an audio digital to analog converter (audio D/A) 514 and a SPDIF output 516. The DSP 502 can further include one or more data busses enabling the different DSP components to communicate with each other and cooperatively process data. Notably, interrupt requests (IRQs) and direct memory addresses (DMAs) can be utilized to facilitate bus communications and data processing.

Audio/Video (A/V) input selector 538 includes a plurality of A/V inputs. For example, the input selector 538 can incorporate an A/V input to receive streams of video content from a tuner 540. For instance, the tuner 540 can include an input port for receiving streams of video content. The tuner 540 can be configured to receive a plurality of streams of video content simultaneously over multiple channels, and the input selector also can receive video content from various other input devices as well. For example, a video camera can send video content to the input selector 538 via front A/V input 542, and a VCR can send video content via rear A/V input 544. Significantly, other A/V devices can be connected to the A/V input selector 538 as well.

The A/V input selector 538 forwards the received video content to DSP 502. The DSP's A/D converter 504 can be used to convert video content received in an analog format to a digital format. Video content already in digital format can bypass the analog to digital conversion, for example, video content received digital video stream via a digital interface 546.

FPGA 508 provides processing instructions for data received from the A/V input selector 538 or the digital interface 546, depending on the type of data received. For example, if video content is received in an uncompressed form, FPGA 508 can forward the video content to encoder/decoder 506 for compression prior to being sent to the record/playback interface 510. The compression can be a standard video compression scheme, or a modified compression scheme in which a greater number of images are encoded as I-images in comparison to standard compression schemes. For instance, images can be sequentially selected from the stream of video content for encoding as I-images. Alternatively, the FPGA 508 can forward the video content to the record/playback interface for storage on the data store 548 in an uncompressed format.

If video content is received in a compressed format, FPGA 508 can instruct the encoder/decoder 506 to transcode selected images as previously described and then forward the video content to the receive/playback interface 510. In either case the FPGA 508 can provide read/write instructions to the record/playback interface 510, which then can store the video content onto data store 548.

The data store 548 can be connected to the record/playback interface 510 via any suitable communications bus. For example, the data store 510 can be connected to the record/playback interface 510 via an IEEE-1394 bus (FireWire, i.LINK), a universal serial bus (USB), an advanced technology attachment (ATA) bus, a serial ATA (SATA) bus, a peripheral component interconnect (PCI) bus, or any other suitable communications interface.

During playback, the receive/playback interface 510 reads video content from data store 548 and generates a video stream that is forwarded to the encoder/decoder 506 for decompression. Notably, if the video stream contains a significant number of I-images or transcoded I-images and fewer P-images and B-images than standard compression schemes, the workload on the encoder/decoder 506 can be significantly reduced. After decompression the video content can be separated into video and audio signals. The audio signal is forwarded to SPDIF 516 to be output digitally via coaxial output 592 or optical output 594. The audio signal also can be forwarded to audio D/A converter 514 for D/A conversion. After D/A conversion the audio signal is output via headphone jack 534 and/or left and right audio outputs 576 and 578.

The video signal is processed by video digital encoder 512, which performs D/A conversion on the video signal as well as encode the video signal into a variety formats. For example, the video signal can be encoded into an RGB format, separated into luminance and chrominance (Y+C) signals, or encoded into a composite video signal having a National Television Standards Committee (NTSC) format. The composite video and the Y+C video signals is forwarded to video switch 560, while the RGB video signal is forwarded to the video overlay encoder 552.

The video overlay encoder 552 comprises overlay module 554, NTSC video encoder 556, and YPbPr matrix encoder 558. The overlay module 554 receives program information from a program information module 550 and graphically overlays the program information onto the video signal. The program information module 550 can extract the program information from a program guide. The program guide can be provided from a myriad of sources. For example, the program guide can be provided from an on-line source, a modem dialup connection, a pager network, etc. The program guide also can be contained in incoming video content received by the AN input selector 538 and communicated to the program information module 550 by the DSP 502.

The program information can include available programs for each channel as well as program scheduling. Further, for each individual program the program information can include a program identifier, channel information, recording time, program duration, scene data, program credits, etc. Other information and graphics may be overlayed onto the video signal as well. For example, a clock, text blocks, user information, menus, icons, pictures, etc. can be overlayed onto the video signal. Typically, information is overlayed onto the video signal when requested by a user or upon some predefined event. However, some information, such as a channel identifier, can be continually overlayed over the video signal.

The NTSC encoder can output the video signal as an NTSC formatted composite video signal, as well as video separated into separate luminance and chrominance signals. The video signals then can be forwarded to the video switch 560. The video switch 560 is used to select for display either the NTSC encoded video signal or the video signal generated by the video digital encoder 512. Composite video signals from either source can be output via composite video output connector 574, while chrominance and luminance video signals from either source can be output via the S-video output connector 572.

The YPbPr matrix encoder 558 generates a YPbPr formatted analog video signal. As previously noted, the YPbPr video signal includes a video luminance (Y) component, an analog blue color difference (B−Y), and an analog red color difference (R−Y). The Y component can be output to the Y output connector 582, the (B−Y) difference can be output to the Pb output connector 584 and the (R−Y) difference can be output to the Pr output connector 586.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with a computer program that, when being loaded and executed, controls the processing system such that it carries out the methods described herein.

The present invention also can be embedded in a computer program product, which comprises all the features enabling the implementation of the methods described herein, and which when loaded in a processing system is able to carry out these methods. Computer program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

While the foregoing is directed to the preferred embodiment of the present invention, other and further embodiments of the invention may be devised without departing from the basic scope thereof. Accordingly, the scope of the present invention is determined by the claims that follow.

The invention claimed is:

1. A method for facilitating processing of images for trick play contained in an encoded video stream comprising:
    transcoding a plurality of non-intra coded images into intra-coded images (I-images);
    storing a plurality of said transcoded I-images on a data storage;
    after said storing, defining a sliding image sequence window containing a plurality of recently transcoded I-images, said sliding image sequence window tracking normal playback of said encoded video stream; and
    storing only transcoded I-images which fall within said sliding image sequence window by deleting, from said data storage, ones of said stored transcoded I-images which fall outside said sliding image sequence window.

2. The method of claim 1, wherein said transcoding comprises exclusively transcoding predictive images (P-images).

3. The method of claim 1, wherein said transcoding comprises exclusively transcoding bidirectional images (B-images).

4. The method of claim 1, wherein said transcoding comprises transcoding predictive images (P-images) and bidirectional images (B-images).

5. The method of claim 1, further comprising:
during fast playback trick mode, decoding a combination of said transcoded I-images and originally coded images, said transcoded I-images being used as references for predicting respective ones of said originally coded images.

6. The method of claim 1, wherein said step of transcoding the non-intra coded images into I-images is performed during normal playback of said encoded video stream.

7. The method of claim 1, further comprising decoding said transcoded I-images during trick mode playback of said encoded video stream.

8. The method of claim 7, wherein said trick mode playback is reverse trick play.

9. The method of claim 7, wherein said trick mode playback is fast reverse trick play.

10. The method of claim 7, wherein said trick mode playback is fast forward trick play.

11. An apparatus for facilitating processing of images for trick play contained in an encoded video stream comprising:
an encoder for transcoding a plurality of non-intra coded images into intra- coded images (I-images);
a data storage means for storing a plurality of said transcoded I-images;
after said storing, a processor for defining a sliding image sequence window containing a plurality of recently transcoded I-images, said sliding image sequence window tracking normal playback of said encoded video stream; and
said processor for deleting, from said data storage means, ones of said stored transcoded I-images which fall outside said sliding image sequence window to thereby store only transcoded I-images which fall within said sliding image sequence window.

12. The apparatus of claim 11, wherein said encoder exclusively transcodes predictive images (P-images).

13. The apparatus of claim 11, wherein said encoder exclusively transcodes bidirectional images (B-images).

14. The apparatus of claim 11, wherein said encoder transcodes predictive images (P-images) and bidirectional images (B-images).

15. The apparatus of claim 11, wherein during fast playback trick mode, a decoder decodes a combination of said transcoded I-images and originally coded images, said transcoded I-images being used as references for predicting ones of said originally coded images.

16. The apparatus of claim 11, wherein said encoder transcodes the non-intracoded images into I-images during normal playback of said encoded video stream.

17. The apparatus of claim 11, wherein a decoder decodes said transcoded I-images during trick mode playback of said encoded video stream.

18. The apparatus of claim 11, wherein said apparatus comprises a personal video recorder.

\* \* \* \* \*